US009968521B1

(12) United States Patent
Price et al.

(10) Patent No.: US 9,968,521 B1
(45) Date of Patent: May 15, 2018

(54) SAFETY MECHANISM AND METHOD FOR AUTOMATED MEDICATION DISPENSERS

(71) Applicant: Quality Manufacturing Systems, Inc., LaVergne, TN (US)

(72) Inventors: Matthew Price, LaVergne, TN (US); Edward Mayercik, LaVergne, TN (US); Edward E. Stinnett, LaVergne, TN (US)

(73) Assignee: QUALITY MANUFACTURING SYSTEMS, INC., LaVergne, TN (US)

( * ) Notice: Subject to any disclaimer, the term of this patent is extended or adjusted under 35 U.S.C. 154(b) by 135 days.

(21) Appl. No.: 15/070,924

(22) Filed: Mar. 15, 2016

(51) Int. Cl.

| | |
|---|---|
| ***A61J 7/00*** | (2006.01) |
| ***G07F 17/00*** | (2006.01) |
| ***B65D 83/04*** | (2006.01) |
| ***G06K 7/10*** | (2006.01) |

(52) U.S. Cl.
CPC ........ *A61J 7/0076* (2013.01); *B65D 83/0409* (2013.01); *G06K 7/10366* (2013.01); *G07F 17/0092* (2013.01); *A61J 2205/60* (2013.01); *B65D 2583/005* (2013.01)

(58) Field of Classification Search
None
See application file for complete search history.

(56) References Cited

U.S. PATENT DOCUMENTS

| | | | | |
|---|---|---|---|---|
| 6,776,306 B1 * | 8/2004 | Michael | G07F 11/42 | 221/100 |
| 2005/0125097 A1 * | 6/2005 | Chudy | G06F 19/3462 | 700/236 |
| 2006/0058724 A1 * | 3/2006 | Handfield | A61J 7/0084 | 604/20 |
| 2008/0288105 A1 * | 11/2008 | Mauger | G07F 11/62 | 700/231 |
| 2009/0294467 A1 * | 12/2009 | Yuyama | G07F 11/62 | 221/8 |
| 2010/0287880 A1 * | 11/2010 | Yasunaga | A61J 7/0084 | 53/64 |
| 2013/0331983 A1 * | 12/2013 | Barrett | G06F 19/3462 | 700/236 |

(Continued)

*Primary Examiner* — Anna M Momper
*Assistant Examiner* — Stephen L Akridge
(74) *Attorney, Agent, or Firm* — Patterson Intellectual Property Law, P.C.; Gary L. Montle

(57) ABSTRACT

A dispensing system includes a replenishment container. The replenishment container includes a container door, a container lock for the container door, and an identifier to indicate an identification of the container contents. The system also includes a dispenser to receive the replenishment container. The dispenser includes a dispenser door to selectively communicate the dispenser with the container, a container detector to continuously detect a presence or absence of the identifier and provide a signal corresponding to the identification of the contents of the container, a switch to detect when the dispenser door is not fully closed, and a controller. The controller receives the identification signal from the container detector, compares the identification of the contents of the container with an expected identification, unlocks the container lock if the identifications match, and prevents the dispenser from dispensing if the identifications do not match or if no identifier is detected.

9 Claims, 7 Drawing Sheets

(56) References Cited

U.S. PATENT DOCUMENTS

| | | | | |
|---|---|---|---|---|
| 2014/0025199 | A1* | 1/2014 | Berg | G07F 11/005 700/232 |
| 2015/0127145 | A1* | 5/2015 | Kim | G06F 19/3462 700/235 |
| 2015/0190312 | A1* | 7/2015 | Yuyama | G06F 19/3462 700/232 |
| 2015/0196458 | A1* | 7/2015 | Schultz | G06F 19/3462 700/232 |
| 2016/0331640 | A1* | 11/2016 | Koike | A61J 3/00 |
| 2016/0371462 | A1* | 12/2016 | Wallen | G06F 19/3462 |
| 2017/0135907 | A1* | 5/2017 | Paz | A61J 7/0481 |
| 2017/0304153 | A1* | 10/2017 | Williamson | G06F 19/3462 |
| 2017/0348194 | A1* | 12/2017 | Duda | A61J 7/0084 |

* cited by examiner

SAFETY MECHANISM AND METHOD FOR AUTOMATED MEDICATION DISPENSERS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to automated methods and systems for dispensing medications and similar products. More particularly, the present invention pertains to safety mechanisms and methods for automated medication dispensers.

Automated tablet dispensers often handle drugs that can be harmful if taken by one to whom the medication is not prescribed. Many drugs handled by automated tablet dispensers may also be abused. Furthermore, it is important to prevent the opportunity to tamper with such medications to ensure the safety of the end consumers of the medication.

BRIEF SUMMARY OF THE INVENTION

The present invention relates generally to a method and system for continuously checking whether a replenishment container is attached to a corresponding dispenser, whether the medication in the replenishment container is the correct medication for the dispenser, and whether the dispenser door has been opened when no replenishment container is attached. If any negative result occurs, the system and method prevent the dispenser from dispensing.

The present invention also relates to an automated medication dispensing system. In one embodiment, a medication dispensing system may include a replenishment container. The replenishment container includes a replenishment container door to selectively release contents of the replenishment container, a container lock to lock and unlock the replenishment container door, and an identifier that indicates an identification of the contents of the replenishment container. The medication dispensing system may also include a dispenser. The dispenser receives the replenishment container. The dispenser has a dispenser door positioned to selectively communicate the dispenser with the replenishment container, a replenishment container detector to continuously detect a presence or absence of the identifier and to provide an identification signal corresponding to the identification of the contents of the replenishment container, and a switch to detect whether the dispenser door is not fully closed.

The medication dispensing system may further include a controller. The controller receives the identification signal from the replenishment container detector, and compares the identification of the contents of the replenishment container with a corresponding expected identification of the contents of the replenishment container. If the identification matches the expected identification, the controller unlocks the container lock to allow the replenishment container door to open. If the identification does not match the expected identification and if either the replenishment container door or the dispenser door is not fully closed, the controller prevents the dispenser from dispensing. Also, if no identifier is detected and the dispenser door is not fully closed, the controller prevents the dispenser from dispensing.

In another embodiment, the dispenser further includes a dispenser door lock to lock and unlock the dispenser door and the controller unlocks the dispenser door lock to allow the dispenser door to open if the identification matches the expected identification.

In still another embodiment, the identifier may be a radio frequency identifier chip and the replenishment container detector may include a radio frequency detector.

In yet another embodiment, the switch may be a limit switch and a magnet mounted to the dispenser door and to the dispenser.

In a further embodiment, the replenishment container detector may be configured to continuously provide the identification signal to the controller when the identifier is present before the replenishment container detector, and the controller is further configured to continuously receive the identification signal.

In another embodiment, the controller is further configured to continuously compare the identification of the contents of the replenishment container with the corresponding expected identification.

Some embodiments may include the controller configured to compare the identification signal received from the replenishment container detector to a plurality of corresponding expected identification signals.

Still further embodiments may include the controller further configured to prevent the dispenser from dispensing until at least one protocol of the controller has been reset.

One embodiment may include the controller further configured to allow the at least one protocol to be reset when no dispensing prevention condition is present and a reset command has been entered.

An alternative embodiment of a medication dispensing system may include at least one replenishment container. The replenishment container may have a replenishment container door to selectively release contents of the replenishment container, a container lock to lock and unlock the replenishment container door, and an identifier to indicate an identification of the contents of the replenishment container.

The medication dispensing system may also include a dispenser. The dispenser receives the replenishment container and may include a dispenser door positioned to selectively communicate the dispenser with the replenishment container, a replenishment container detector to continuously detect the identification and presence or absence of the identifier, and a switch to detect whether the dispenser door is fully closed.

The medication dispensing system may further include a controller. The controller receives an identification signal from the replenishment container detector corresponding to the identification of the contents of the replenishment container and compares the identification of the contents of the replenishment container with a corresponding expected identification of the contents of the replenishment container. If the identification matches the expected identification, the controller unlocks the container lock to allow the replenishment container door to open. If the identification does not match the expected identification, the controller sends an error message and the identification. If the identification does not match the expected identification and at least one of the replenishment container door and the dispenser door is open, the controller prevents the dispenser from dispensing. If no identifier is detected and the dispenser door is open, the controller prevents the dispenser from dispensing.

The medication dispensing system may further include a host system. The host system maintains a database of the identification of the contents of each replenishment container, transmits the expected identification to the controller, and receives the error message and identification from the controller when the identification does not match the expected identification. When the host system receives the error message and identification from the controller when the identification does not match the expected identification, the host system compares the identification to all possible correct identifications in the database, and send a new expected identification if the identification matches a correct identification in the database.

In another embodiment, the identifier may include a radio frequency identification chip, and the replenishment container detector may include a radio frequency detector.

In still another embodiment, the controller is further configured to continue preventing the dispenser from dispensing until a reset signal is received.

In yet another embodiment, the host system may be further configured to send the reset signal to the controller when a reset command has been entered in the host system.

In a further embodiment, the controller is further configured to ignore the reset signal from the host system and to send an ignored signal message to the host system when a condition to prevent the dispenser from dispensing is present.

In another further embodiment, the controller is further configured to prevent the dispenser from dispensing if the identification does not match the expected identification and only the dispenser door is open.

In still a further embodiment, the dispenser further includes a dispenser door lock to lock and unlock the dispenser door, and the controller unlocks the dispenser door lock to allow the dispenser door to open if the identification matches the expected identification.

The present invention also relates to a method for dispensing medication. The method may include continuously detecting a presence or absence of a container identification of any of a plurality of medication replenishment containers; if a medication replenishment container is correctly attached to a medication dispenser, continuously detecting a present container identification of the medication replenishment container; continuously comparing the present container identification with an expected container identification; if the present container identification does not match the expected container identification, checking the medication associated with the present container identification; if the medication associated with the present container identification matches the medication associated with the expected container identification, updating the expected container identification to include the present container identification; if the present container identification matches the expected identification, unlocking a medication dispenser door or an attached replenishment container door; and if the medication dispenser door or the attached replenishment container door is open, and if no container identification is detected or if the present container identification does not match the expected container identification, preventing the medication dispenser from dispensing medication.

Another embodiment of the method may further include entering a reset command when the medication dispenser is prevented from dispensing medication, and allowing the medication dispenser to dispense medication if the reset command has been entered and no prevention conditions are present.

Yet another embodiment of the method may include unlocking both the medication dispenser door and the attached replenishment container door.

Still another embodiment of the method may include preventing the medication dispenser from dispensing medication if only the medication dispenser door is open, and if no container identification is detected or if the present container identification does not match the expected container identification.

Numerous objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
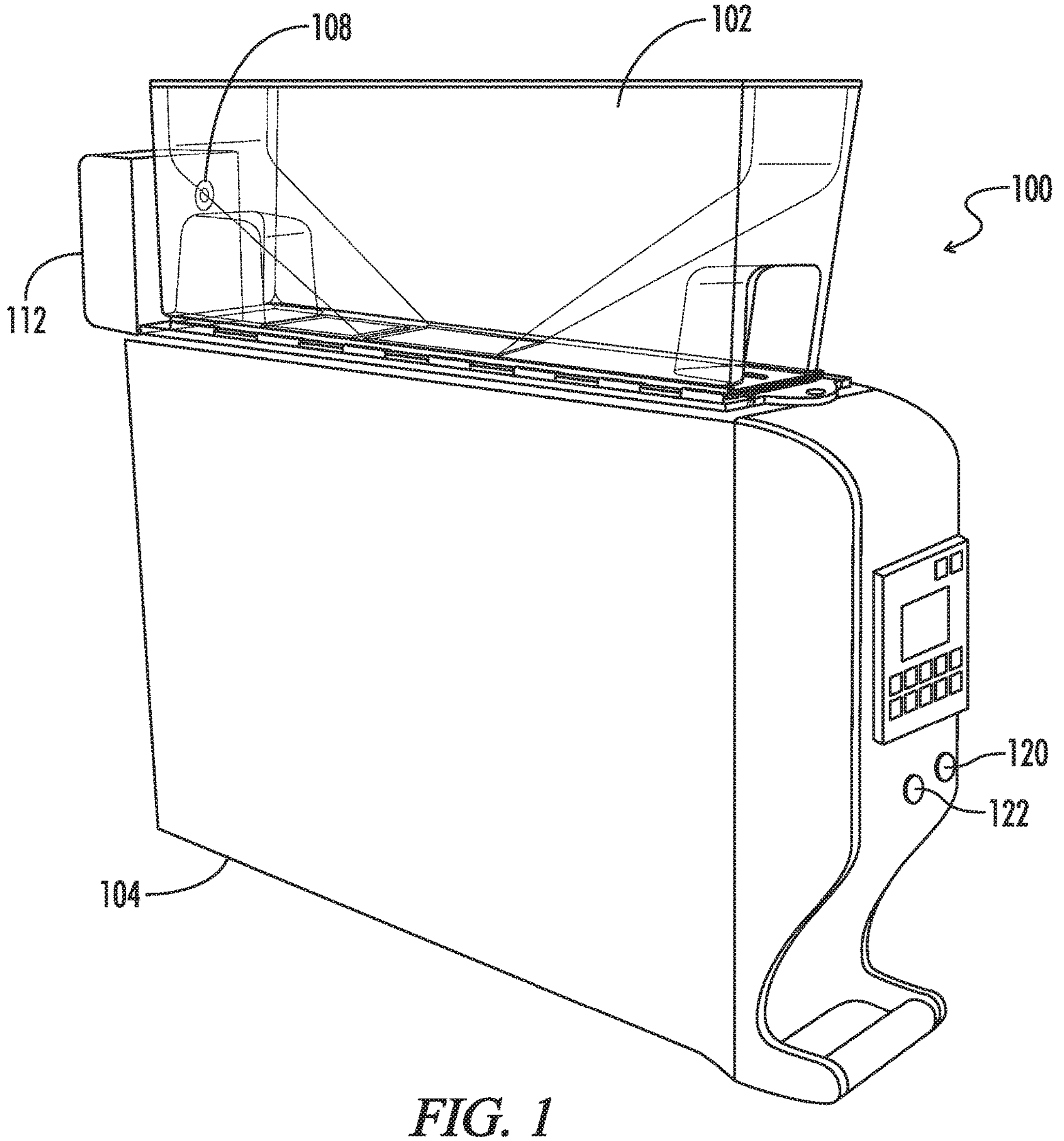
FIG. 1 is a perspective view of an embodiment of a medication dispensing system according to aspects of the present invention.

While the making and using of various embodiments of the present invention are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

U.S. Pat. Nos. 8,141,330 and 8,601,776, which are incorporated herein by reference, describe helpful background information for tablet dispenser filling operations and exemplary constructions of tablet dispensers.

Referring generally to FIGS. 1-7, various exemplary embodiments of the present invention are described in detail. Where the various figures may describe embodiments sharing various common elements and features with other embodiments, similar elements and features are given the same reference numerals and redundant description thereof may be omitted below.

Figure 2:
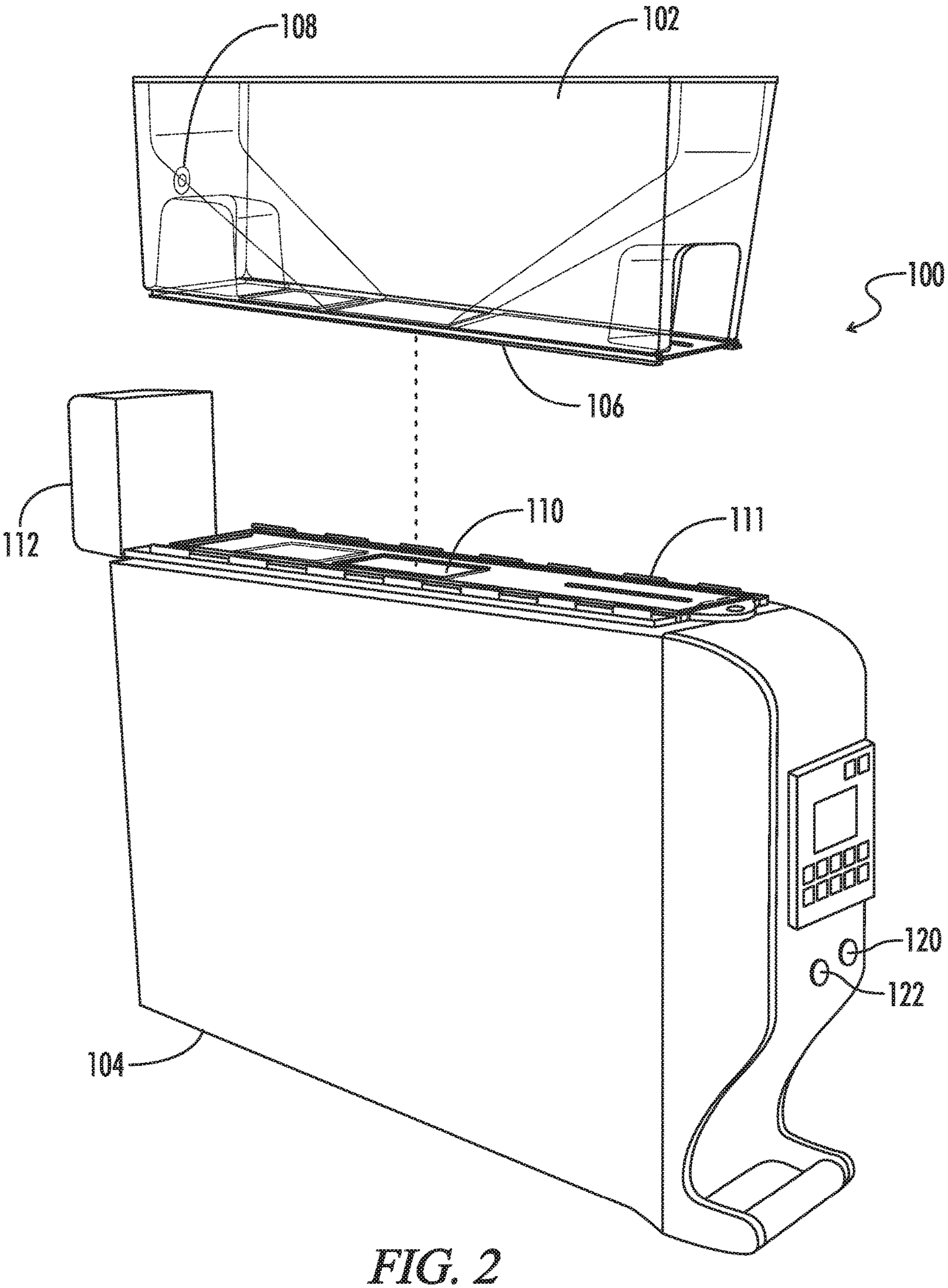
FIG. 2 is a partially exploded perspective view of the medication dispensing system of FIG. 1.
Figure 3:
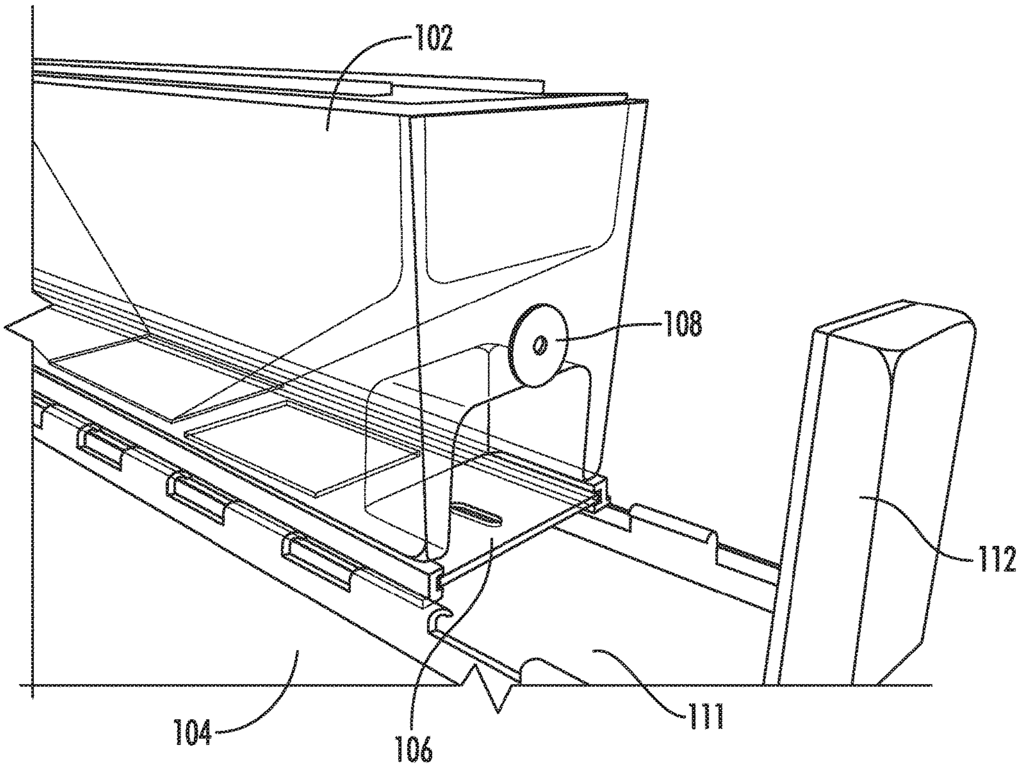
FIG. 3 is a detailed perspective view of the medication dispensing system of FIG. 1 showing an exemplary identifier on a replenishment container and an exemplary replenishment container detector on a dispenser.
Figure 4:
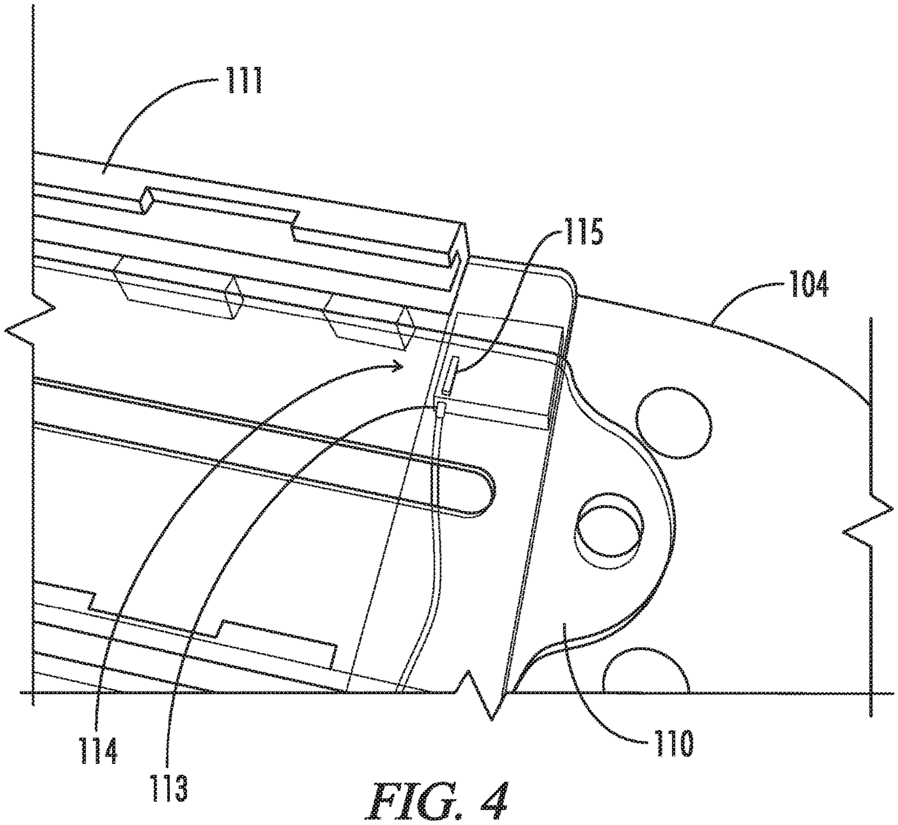
FIG. 4 is another detailed perspective view of the medication dispensing system of FIG. 1 showing an exemplary door sensor.
Figure 5:
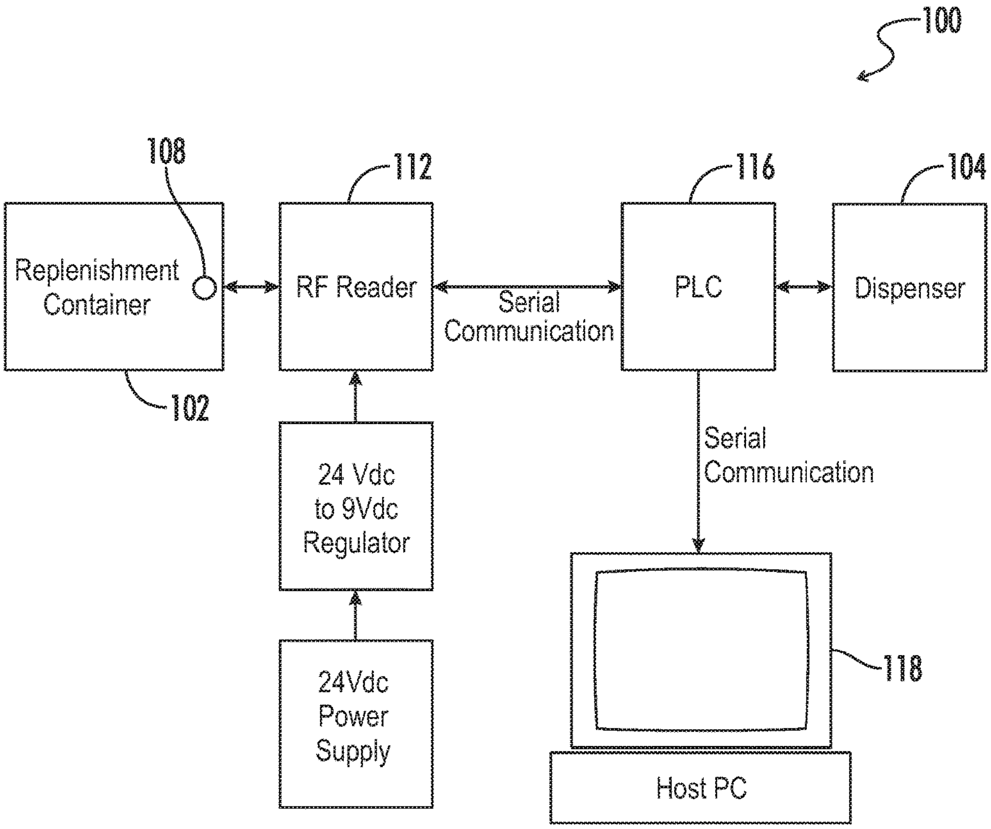
FIG. 5 is a block diagram of one embodiment of a medication dispensing system according to aspects of the invention.

FIGS. 1 and 2 show an exemplary embodiment of a medication dispensing system 100 according to aspects of the present invention. The medication dispensing system may include at least one replenishment container 102 and a dispenser 104 configured to receive the replenishment container. The replenishment container 102 may include a replenishment container door 106 to selectively release contents of the replenishment container. In one embodiment, the replenishment container door 106 may be a sliding door located at the bottom of the replenishment container. The replenishment container 102 may have an internal shape including, but not limited to, an angled or funnel shape that facilitates the travel of the medication through the replenishment container door 106 (FIG. 3). A container lock (not shown) locks and unlocks the replenishment container door 106. Other security measures may also be implemented with regard to the replenishment container 102 including, but not limited to, tamper evidencing stickers, tags, sensors, and the like.

Each replenishment container 102 may include an identifier 108. The identifier 108 indicates an identification of the contents of the respective replenishment container 102. The identifier 108 may, in non-limiting examples, be a radio frequency identification device, a computer chip, a bar code, and the like. Other modes of identifying the contents of the replenishment container 102 may also be included. Non-limiting examples include a bar code, a label, images of the appropriate medication, and the like. In some embodiments, a user or machine may verify that the correct medication is being placed in the replenishment container 102 by cross-checking the medication with the one or more identifiers 108 prior to sealing/locking the replenishment container.

The dispenser 104 may include a dispenser door 110. In some embodiments, the dispenser 104 may also have a dispenser door lock (not shown). The dispenser door 110 is positioned to selectively communicate the dispenser 104 with an attached replenishment container 102. In one embodiment, the dispenser door 110 and the replenishment container door 106 are aligned when the replenishment container 102 is properly attached to the dispenser 104. In an exemplary embodiment as shown in FIG. 2, the dispenser 104 may include a replenishment container attachment plate 111 that allows attachment of a corresponding replenishment container 102 in only one orientation and location on the dispenser. In some embodiments, the dispenser door 110 is a sliding door that is positioned at the top of the dispenser 104.

The dispenser 104 may further include a replenishment container detector 112. The replenishment container detector 112 continuously detects a presence or absence of the identifier 108, as well as the identification information of the identifier. The replenishment container detector 112 may provide an identification signal corresponding to the identification of the contents of the replenishment container 102. The replenishment container detector 112 may, in non-limiting examples, be a radio frequency identification sensor, a bar code scanner, any other visual sensor, and the like.

The dispenser 104 may also include a switch 114. The switch 114 detects whether the dispenser door 110 is fully closed. The switch 114 may, in non-limiting examples, be a light sensor, magnetic sensor, mechanical switch, and the like. The switch 114 transmits a signal when the dispenser door 110 is open, closed, or moved a threshold distance. In one non-limiting example shown in FIG. 4, the switch 114 may include a sensor 113 and a magnet 115. The sensor 113 produces a signal either when the magnet 115 is proximate to or not proximate to the sensor. One of either the sensor 113 or magnet 115 may be located on the dispenser 104, and the other of the sensor and magnet may be located on the dispenser door 110. The dispenser 104 may also include a dispenser door lock (not shown) on the dispenser door 110. Other embodiments of the dispenser 104 may further include other tamper evidencing stickers, tags, sensors, and the like. In some embodiments, the dispenser door 110 may be unable to open unless a corresponding replenishment container 102 is correctly attached to the dispenser 104.

The medication dispensing system 100 may also include a controller 116. The controller 116 receives the identification signal from the replenishment container detector 112 corresponding to the identification of the contents of the replenishment container 102. The controller 116 compares the identification of the contents of the replenishment container 102 with a corresponding expected identification of the contents of the replenishment container. In some embodiments, the controller 116 may be pre-programmed with one or more acceptable identifications that correspond to the correct medication to be dispensed into the dispenser 104. If the identification received by the controller 116 from the replenishment container detector 112 matches the expected identification, the controller unlocks the container lock to allow the replenishment container door to open. In some embodiments, the dispenser door 110 may be locked in addition to, or instead of, the replenishment container door 106. In such embodiments, the controller 116 unlocks the dispenser door 110 to allow it to be opened when the information received by the controller matches the expected identification. If the identification received by the controller 116 does not match the expected identification, the controller checks if at least one of the replenishment container door 106 and the dispenser door 110 is open. If one or both of the doors 106, 110 is open, the controller 116 prevents the dispenser 110 from dispensing. The controller 116 may prevent the dispenser 110 from dispensing in exemplary embodiments by preventing the function of internal components of the dispenser, closing a door, preventing opening of a door, and the like. The controller 116 may also prevent the dispenser 104 from dispensing if no identifier 108 is detected by the replenishment container detector 112 and the dispenser door 110 is open. In some embodiments, the controller 116 sends an error message if the identification does not match the expected identification. In some embodiments, the controller 116 prevents the dispenser 104 from dispensing until at least one protocol of the controller has been reset. The controller 116 may allow the at least one protocol to be reset when no dispensing prevention condition is present and a reset command has been entered.

Some embodiments of the medication dispensing system 100 may further include a host system 118. The host system 118 may maintain a database of the identification of the contents of each replenishment container 102. The host system 118 includes the identification of the contents database associated with the corresponding unique identifier 108 for each replenishment container 102. The host system 118 transmits expected identifications of the contents of replenishment containers 102 to the controller 116. The host system 118 receives an error message sent from the controller 116 when the identification of the contents of the replenishment container 102 does not match the expected identification. Stated in another way, in some embodiments the host system 118 receives an error message sent from the controller 116 when the identifier 108 sensed by the replenishment container detector 112 does not match the expected identifier in the database for the corresponding dispenser 104. Along with the error message, the host system 118 may receive an identification (or a signal corresponding to the data from the replenishment container detector 112 upon sensing the identifier 108) of the replenishment container 102 currently attached to the dispenser 104. The host system 118 may then compare the identification received to all possible correct identifications in the database for the particular dispenser 104. If another proper identification is available in the database that matches the correct identification for the particular dispenser 104, the host system 118 sends that new expected identification to the controller 116.

The host system 118 may be configured, in some embodiments, to send a reset signal to the controller 116 when a reset command has been entered in the host system. In such a configuration, the controller 116 may be configured to ignore the reset signal from the host system 118 and send an ignored signal message to the host system when a condition to prevent the dispenser 104 from dispensing remains present. Alternatively, the controller 116 may simply activate the error indicator 120 again.

Figure 6:
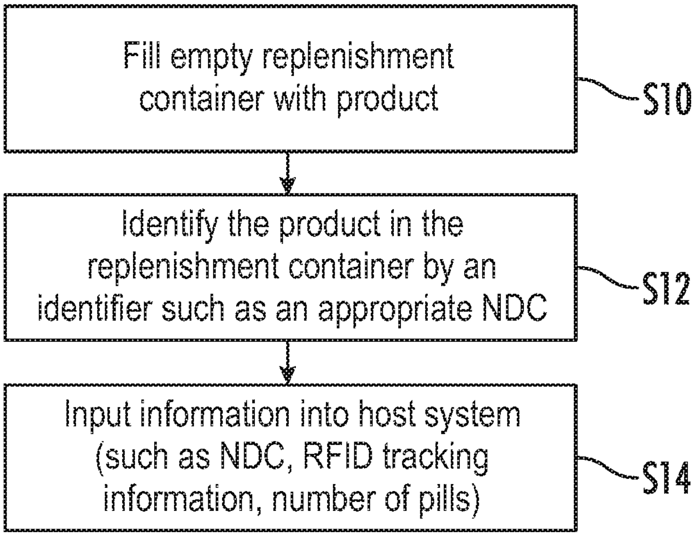
FIG. 6 is a flowchart of exemplary replenishment container preparation to be used in an embodiment of a medication dispensing system according to aspects of the invention.

In some embodiments, methods such as the exemplary method shown in FIG. 6 may be performed to aid in the execution of embodiments of the method or apparatus of the current invention. As shown in FIG. 6, the method begins at step S10. At step S10, a user or machine may fill an empty replenishment container 102 with a proper medication. At the next step, step S12, the medication in the replenishment container 102 may be identified with proper identification information (such as the NDC, or National Drug Code). Then, at step S14, the identification information, paired with other useful information (such as the information from the identifier 108 attached to the replenishment container 102, the number of pills in the replenishment container, and the like) may be input into the host system 118 for later use.

Figure 7:
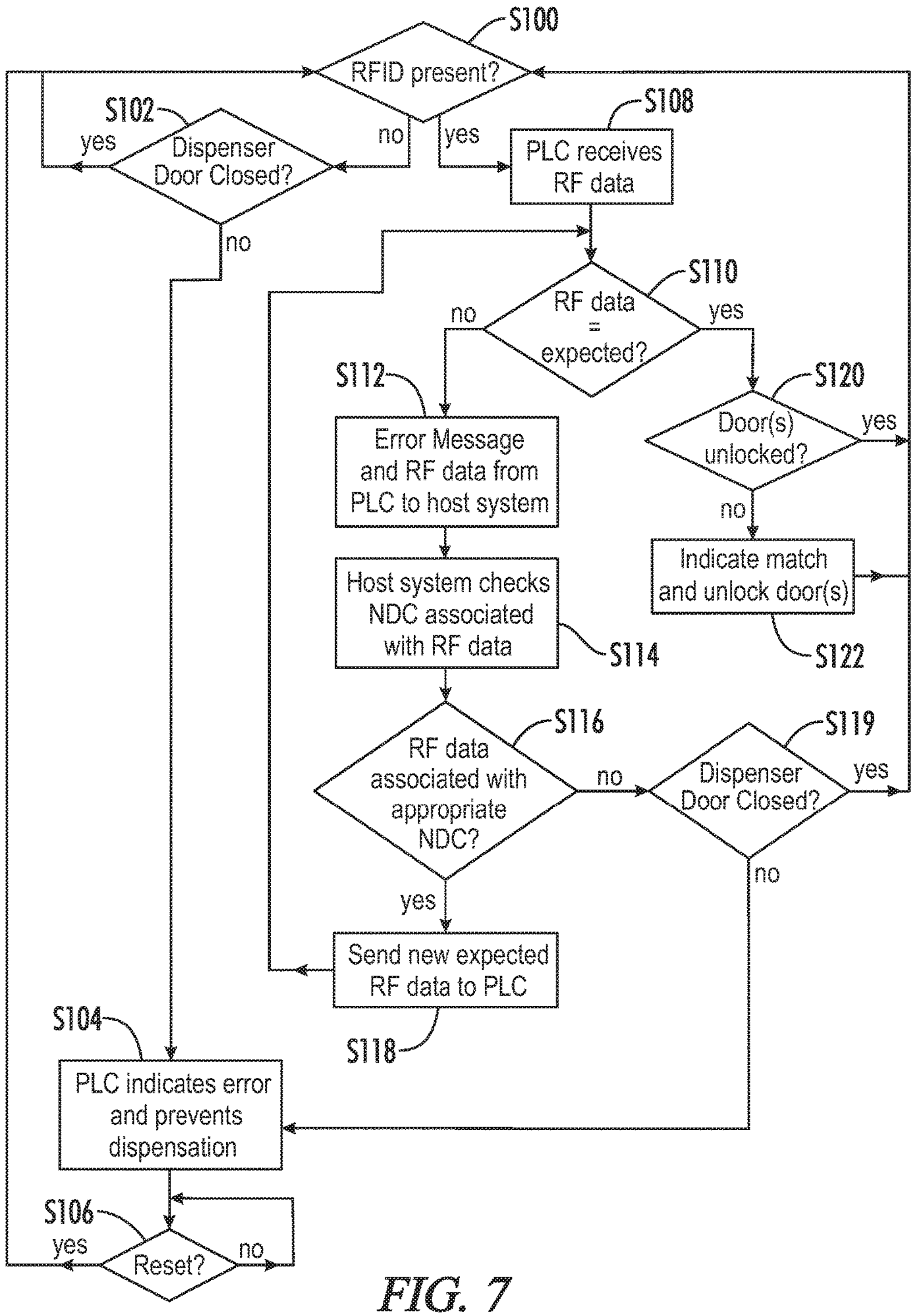
FIG. 7 is a flowchart of exemplary processing for medication dispensing.

The present invention is also related to a method for dispensing medication. FIG. 7 shows an exemplary embodiment of the method for dispensing medication. As shown in FIG. 7, the method begins at step S100.

Step S100 is an inquiry as to whether an identifier 108, such as an RFID chip, is present before the replenishment container detector 112. If the replenishment container detector 112 detects no identifier 108, the method proceeds to step S102.

Step S102 is an inquiry as to whether the dispenser door 110 is fully closed. If the dispenser door 110 is fully closed, the method returns to step S100. If the dispenser door 110 is not fully closed, the method proceeds to step S104.

At step S104, the controller 116 activates an error indicator 120 (for instance, a red light) and prevents the dispenser 104 from dispensing medication. The method then proceeds to step S106.

Step S106 is an inquiry as to whether a reset signal has been sent from the host system 118 to the controller 116. In some embodiments, the controller 116 itself may allow a local reset with a proper passcode and security procedures, for instance. If the reset signal has been sent, the method returns to step S100. If the reset signal has not been sent, the controller 116 continues to prevent dispensing of medication from the dispenser 104 until a reset signal has been sent.

Returning to the top of FIG. 7, if the replenishment container detector 112 detects an identifier 108, the method then proceeds to step S108. Step S108 includes the controller 116 receiving the identification data corresponding to the identifier 108 from the replenishment container detector 112. The method then proceeds to step S110.

Step S110 is an inquiry as to whether the identification data received from the replenishment container detector 112, corresponding to the identifier 108 of the attached replenishment container 102, matches an expected identification data result. The controller 116 compares the input data from the replenishment container detector 112 with a stored expected identification value or values. If the input data does not match a stored expected identification value, the method proceeds to step S112.

At step S112, the controller 116 sends an error message to the host system 118. The controller 116 also sends the identification data corresponding to the currently detected identifier 108 to the host system 118. The method then proceeds to step S114.

At step S114, the host system checks its database for the medication information associated with the currently detected identifier 108. In some embodiments, the database may include the NDC data for each medication in each replenishment container 102 and the corresponding identifier 108 for each replenishment container. The method then proceeds to step S116.

Step S116 is an inquiry as to whether the identification data of the currently detected identifier 108 is associated with the proper medication in the database. In one embodiment, the host system 118 may carry out this inquiry. Other embodiments may include the controller 116 carrying out the inquiry. If the identification data of the currently detected identifier 108 is associated with the proper medication information (such as NDC), the method then proceeds to step S118.

Step S118 includes, in one non-limiting embodiment, the host system 118 sending a new expected identification data associated with the currently detected identifier 108. The method then proceeds back to step S110, where the identification data will be verified as corresponding to an expected identification value.

Returning now to step S116 of FIG. 7, if the identification data of the currently detected identifier 108 is not associated with the proper medication information (such as NDC), the method then proceeds to step S119. In a non-limiting embodiment, the controller 116 may activate the error indicator 120 or some other device to indicate that the identifier 108 is not associated with the proper medication information.

Step S119 is an inquiry as to whether the dispenser door is fully closed. If the dispenser door is fully closed, the method proceeds back to step S100. The dispenser 104 is not yet prevented from dispensing medication because no risk of contamination has occurred. If the dispenser door is not fully closed, the method then proceeds to step S104. The method then continues from step S104 as discussed above.

Returning now to step S110 of FIG. 7, if the input data does match a stored expected identification value, the method proceeds to step S120. Step S120 is an inquiry as to whether at least one of the replenishment container door 106 and the dispenser door 110 is unlocked. In some embodiments, the method only inquires as to the status of the dispenser door 110. If at least one of the dispenser door 110 and the replenishment container door 106 is already unlocked, the method returns to step S100. If at least one of the dispenser door 110 and the replenishment container door 106 is not already unlocked, the method proceeds to step S122.

At step S122, the controller 116 activates a success indicator 122 (for instance, a green light) and unlocks at least one of the dispenser door 110 and the replenishment container door 106 so it may be opened either automatically or by a user. The method then returns to step S100.

In this manner, the method for dispensing medication (and the corresponding system configured to accomplish the method) may continuously check whether a replenishment container 102 is attached to the dispenser 104, whether the medication is the correct medication for the dispenser, and whether the dispenser door 110 has been opened when no replenishment container is attached.

The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof that is configured by hardware design, firmware, and/or software programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of the present invention of a new and useful SAFETY MECHANISM AND METHOD FOR AUTOMATED MEDICATION DISPENSERS", it is not intended that such references be construed as limitations upon the scope of this disclosure except as set forth in the following claims.

What is claimed is:

1. A medication dispensing system comprising:

at least one replenishment container including
- a replenishment container door to selectively release contents of the replenishment container,
- a container lock configured to lock and unlock the replenishment container door, and
- an identifier configured to indicate an identification of the contents of the replenishment container;

a dispenser configured to receive the replenishment container, the dispenser including
- a dispenser door positioned to selectively communicate the dispenser with the replenishment container,
- a replenishment container detector configured to continuously detect a presence or absence of the identifier and to provide an identification signal corresponding to the identification of the contents of the replenishment container, and
- a switch configured to detect whether the dispenser door is fully closed; and a controller configured to
- receive the identification signal from the replenishment container detector,
- compare the identification of the contents of the replenishment container with a corresponding expected identification of the contents of the replenishment container,
- if the identification matches the expected identification, unlock the container lock to allow the replenishment container door to open,
- if the identification does not match the expected identification and at least one of the replenishment container door and the dispenser door is not fully closed, prevent the dispenser from dispensing; and
- if no identifier is detected and the dispenser door is not fully closed, prevent the dispenser from dispensing.

2. The medication dispensing system of claim 1, wherein:
- the dispenser further includes a dispenser door lock configured to lock and unlock the dispenser door; and
- the controller is further configured to unlock the dispenser door lock to allow the dispenser door to open if the identification matches the expected identification.

3. The medication dispensing system of claim 1, wherein:
- the identifier includes a radio frequency identifier chip; and
- the replenishment container detector includes a radio frequency detector.

4. The medication dispensing system of claim 1, wherein the switch includes one of a limit switch and a magnet mounted to the dispenser door, and a corresponding other of the limit switch and the magnet mounted to the dispenser.

5. The medication dispensing system of claim 1, wherein:
- the replenishment container detector is further configured to continuously provide the identification signal to the controller when the identifier is present before the replenishment container detector; and
- the controller is further configured to continuously receive the identification signal.

6. The medication dispensing system of claim 5, wherein the controller is further configured to continuously compare the identification of the contents of the replenishment container with the corresponding expected identification.

7. The medication dispensing system of claim 1, wherein the controller is configured to compare the identification signal received from the replenishment container detector to a plurality of corresponding expected identification signals.

8. The medication dispensing system of claim 1, wherein the controller is further configured to prevent the dispenser from dispensing until at least one protocol of the controller has been reset.

9. The medication dispensing system of claim 8, wherein the controller is further configured to allow the at least one protocol to be reset when no dispensing prevention condition is present and a reset command has been entered.

* * * * *